(12) United States Patent
Garg

(10) Patent No.: US 11,997,639 B2
(45) Date of Patent: May 28, 2024

(54) DETECTING NUISANCE AND RESTRICTED COMMUNICATIONS VIA A COMMUNICATION PRIVILEGE CONTROL SYSTEM

(71) Applicant: T-Mobile USA, Inc., Bellevue, WA (US)

(72) Inventor: Parag Garg, Woodinville, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 277 days.

(21) Appl. No.: 17/126,718

(22) Filed: Dec. 18, 2020

(65) Prior Publication Data
US 2021/0105354 A1    Apr. 8, 2021

Related U.S. Application Data

(63) Continuation of application No. 16/215,465, filed on Dec. 10, 2018, now Pat. No. 10,887,446.

(Continued)

(51) Int. Cl.
*G06F 21/10*   (2013.01)
*H04L 9/40*    (2022.01)
(Continued)

(52) U.S. Cl.
CPC ......... *H04W 68/005* (2013.01); *H04L 63/107* (2013.01); *H04L 63/20* (2013.01); *H04L 67/52* (2022.05); *H04W 4/029* (2018.02); *H04W 24/08* (2013.01); *G10L 17/00* (2013.01); *G10L 17/06* (2013.01); *H04L 65/1083* (2013.01); *H04L 67/303* (2013.01); *H04L 67/53* (2022.05); *H04M 1/72463* (2021.01)

(58) Field of Classification Search
CPC ... H04W 4/029; H04W 24/08; H04W 68/005; H04L 67/52; H04L 67/53; H04L 63/107; H04L 63/20; H04L 65/1083; H04L 67/303
USPC .......................................................... 726/1
See application file for complete search history.

(56) References Cited

U.S. PATENT DOCUMENTS 10,540,651 B1 *  1/2020  Robinson ............ H04L 63/0281
10,737,180 B1    8/2020  Noland et al.
(Continued)

FOREIGN PATENT DOCUMENTS

CA    2831890 A1 * 10/2012 ........... G06Q 20/327
CA    2961907 C  *  7/2021 ............. G06F 16/44

OTHER PUBLICATIONS

U.S. Appl. No. 16/215,465, Notice of Allowance dated Sep. 4, 2020, 38 pages.

(Continued)

*Primary Examiner* — Haresh N Patel

(57) ABSTRACT

This disclosure describes techniques that enable a Communication Privilege Control (CPC) system to determine whether a real-time communication session is to be restricted. The CPC system may be configured to detect a real-time communication session between a Secondary Account Holder (SAH) device of a client account and a third-party device, and in doing so, determine with the real-time communication session is to be restricted by a set of communication privilege rules. If the real-time communication session is to be restricted, the CPC system may transmit notification data to a trusted device associated with the client account.

11 Claims, 8 Drawing Sheets

Related U.S. Application Data

(60) Provisional application No. 62/679,882, filed on Jun. 3, 2018, provisional application No. 62/679,594, filed on Jun. 1, 2018.

(51) Int. Cl.
| | | |
|---|---|---|
| *H04L 29/06* | (2006.01) | |
| *H04L 67/52* | (2022.01) | |
| *H04W 4/029* | (2018.01) | |
| *H04W 24/08* | (2009.01) | |
| *H04W 68/00* | (2009.01) | |
| *G10L 17/00* | (2013.01) | |
| *G10L 17/06* | (2013.01) | |
| *H04L 65/1083* | (2022.01) | |
| *H04L 67/303* | (2022.01) | |
| *H04L 67/53* | (2022.01) | |
| *H04M 1/72463* | (2021.01) | |

(56) References Cited

U.S. PATENT DOCUMENTS

| | | | |
|---|---|---|---|
| 2006/0067215 A1* | 3/2006 | Elliott | H04L 43/026 |
| | | | 370/230 |
| 2008/0146337 A1 | 6/2008 | Halonen et al. | |
| 2010/0058064 A1 | 3/2010 | Kirovski et al. | |
| 2010/0130228 A1* | 5/2010 | Vendrow | H04M 3/546 |
| | | | 455/410 |
| 2012/0124671 A1* | 5/2012 | Fritzson | H04L 63/1441 |
| | | | 726/26 |
| 2013/0023254 A1* | 1/2013 | Ricci | H04M 3/4234 |
| | | | 455/417 |
| 2013/0212654 A1 | 8/2013 | Dorfman et al. | |
| 2014/0082695 A1 | 3/2014 | Alsina et al. | |
| 2014/0282914 A1 | 9/2014 | Holmelin et al. | |
| 2014/0325677 A1 | 10/2014 | Kotla et al. | |
| 2015/0026351 A1 | 1/2015 | Calman et al. | |
| 2015/0058619 A1 | 2/2015 | Sweet et al. | |
| 2015/0082372 A1 | 3/2015 | Kottahachchi et al. | |
| 2015/0180894 A1 | 6/2015 | Sadovsky et al. | |
| 2015/0363581 A1 | 12/2015 | Ranadive et al. | |
| 2015/0373198 A1* | 12/2015 | Ruetschi | H04M 3/543 |
| | | | 379/211.01 |
| 2016/0057139 A1 | 2/2016 | McDonough et al. | |
| 2016/0125490 A1 | 5/2016 | Angal et al. | |
| 2016/0127310 A1* | 5/2016 | Sutter | H04L 63/168 |
| | | | 709/224 |
| 2016/0150042 A1* | 5/2016 | Pattison | H04W 4/21 |
| | | | 709/203 |
| 2017/0078275 A1 | 3/2017 | Slovetskiy | |
| 2017/0116615 A1* | 4/2017 | Burgess | G06Q 20/322 |
| 2017/0147795 A1* | 5/2017 | Sardesai | G06F 21/41 |
| 2017/0186008 A1* | 6/2017 | Pachouri | H04L 63/18 |
| 2017/0230825 A1* | 8/2017 | Counterman | H04L 63/0876 |
| 2018/0302761 A1 | 10/2018 | Rizzolo et al. | |
| 2019/0026456 A1 | 1/2019 | Hon et al. | |
| 2019/0116497 A1 | 4/2019 | Veramendi et al. | |
| 2020/0226608 A1 | 7/2020 | Muralidharan et al. | |

OTHER PUBLICATIONS

U.S. Appl. No. 16/215,515, Notice of Allowance dated May 2, 2019, 18 pages.

* cited by examiner

DETECTING NUISANCE AND RESTRICTED COMMUNICATIONS VIA A COMMUNICATION PRIVILEGE CONTROL SYSTEM

RELATED APPLICATIONS

This application is a continuation of U.S. application Ser. No. 16/215,465, filed on Dec. 10, 2018, and titled "DETECTING NUISANCE AND RESTRICTED COMMUNICATIONS VIA A COMMUNICATION PRIVILEGE CONTROL SYSTEM", now U.S. Pat. No. 10,887,446; which claims the benefit of U.S. Provisional Application No. 62/679,594 filed Jun. 1, 2018, and titled "DIVERSION OF INCOMING AND OUTGOING VOICE AND TEXT COMMUNICATIONS"; and U.S. Provisional Application No. 62/679,882 filed Jun. 3, 2018, and titled "DETECTING SUSPICIOUS OR ILL-INTENTIONED INDIVIDUALS VIA ANALYSIS OF REAL-TIME COMMUNICATIONS", which are herein incorporated by reference in their entirety.

BACKGROUND

Today, the use of mobile devices is widespread. Continual advancements in mobile device technology can improve the productivity and quality of life for users by enhancing accessibility to real-time communications in a variety of environmental settings, such as a home, workplace, school, and/or so forth. However, mobile devices are highly susceptible to nuisance concerns by unspecified individuals that target some users for unwanted or ill-intentioned purposes. Unspecified individuals may include telephone marketers or spammers that initiate nuisance via unwanted spam or telemarketing phone calls. Moreover, unspecified individuals may include individuals who impersonate a known person's identity (i.e. phone number) for fraudulent or nuisance purposes.

Further, the continual growth and advancements of mobile device technology can burden a Primary Account Holder (PAH) of a telecommunication service account in their attempt to control the use of telecommunication service features (i.e. voice communication and text communication) by a Secondary Account Holder (SAH). Current communication privilege rules lack sufficient fidelity to enable a PAH to generate fine-grained communication privilege rules that suit a particular user, a particular environmental setting (i.e. work, school, family, friends, and/or so forth), or to flag nuisance or restricted real-time communications to an appropriate trusted device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
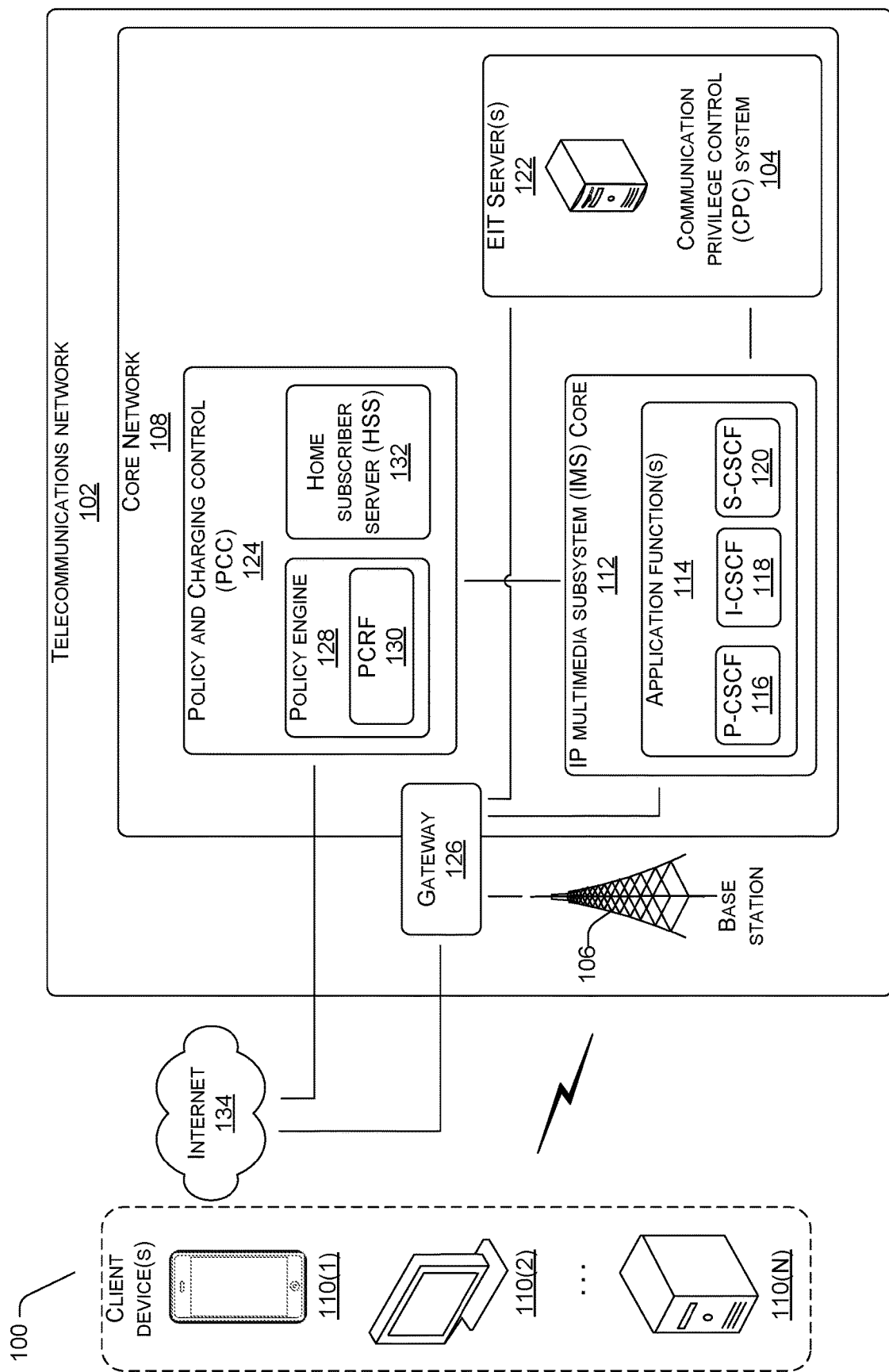
FIG. 1 illustrates a computing environment of a telecommunication network that facilitates an operation of a Communication Privilege Control (CPC) system.

This disclosure describes techniques that facilitate analyzing real-time communication sessions associated with a client device to detect nuisance concerns or determine whether a real-time communication session is restricted based on a set of communication privilege rules. More specifically, a Communication Privilege Control (CPC) system is described that can monitor real-time communication sessions that involve a client device associated with the client account, and another, third-party device. The real-time communication sessions may include voice communications, text communications, or a combination of both. Further, in response to detecting a nuisance concern or flagging a restricted real-time communication session, the CPC system may automatically intercept the real-time communication session and selectively terminate or re-direct the real-time communication session to a trusted device. The conditions by which a real-time communication session is automatically intercepted, selectively terminated or re-directed, may be based at least in part on the set of communication privilege rules established by a PAH of the client account or an administrator of the CPC system. In addition, the CPC system may generate notification data to alert a trusted device. The notification data may comprise an audio or text alert that describes the nuisance concern or restricted communication.

Alternatively, rather than automatically terminating or re-directing the real-time communication session, the CPC system may generate and deploy notification data to a trusted device that presents one or more selectable options on a display of the trusted device. The selectable options may permit a user of the trusted device to terminate the real-time communication session, permit the real-time communication session to continue, or re-direct the real-time communication session from the client device to the trusted device.

The client account, as described herein, may be a telecommunication service account that is provisioned by a telecommunication service provider. The client account may include at least one Primary Account Holder (PAH) and one or more Secondary Account Holders (SAHs). A PAH, or a delegated user, may create, update, or delete communication privilege rules that impact how other clients of the client account (i.e. PAHs and SAHs) interact with the telecommunication service. As described in further detail below, this may include generating and maintaining a set of communication privilege rules, a list of permissible of contacts, a list of impermissible contacts, or a grey-list of contacts, each of which may be generated for a select number of clients (i.e. PAHs and SAHs), or for the client account, generally.

In one example, the trusted device that receives notification data relating to a nuisance concern or a restricted communication may be associated with a Primary Account Holder (PAH) of the client account. In another example, the PAH may delegate permission to a trusted device that is associated with a different user to receive such notification data, based on one or more trust parameters. Trust parameters may correspond to variables used to select a trusted device to receive notification data, from a group of trusted devices. By way of example, trust parameters may include a client device identifier of a client device involved in the real-time communication session, a first geographic location of the client device, a second geographic location of the trusted device, a time of day, a day of the week, or a third-party identifier associated with the third-party device involved in the real-time communication session. Additionally, trust parameters may also include a magnitude of a communication integrity score. Trust parameters may also associate a particular trusted device with a magnitude, or range in magnitude, of a communication integrity score.

Consider an example of a client device involved in a real-time communication session while at school, during school hours, and on a school day. In this example, the CPC system may send a notification to one or more trusted devices that include the PAH and a school representative designated by the PAH, on the basis of the trusted device of the school representative being within a predetermined proximity of the client device. In other words, the CPC system may send the notification to the trusted device associated with the school representative, provided the school representative is also within the school grounds.

In another non-limiting example, the CPC system may designate a group of trusted devices to receive notifications and/or notification data associated with a client (i.e. PAH or SAH). The PAH may further indicate that a notification or notification data is sent to one or more trusted devices within the group, based on their respective geographic proximity to the client device at a point in time that the real-time communication session was initiated. Thus, in response to inferring a nuisance or restricted communication, the CPC system may determine a geographic location of each trusted device within the group in order to further identify a subset of trusted devices that are to receive the notification and/or notification data.

In various examples, the CPC system may monitor real-time communication sessions on a continuous basis, per one or more contact lists, or in response to a triggering event. The contact lists may include at least one of a list of permissible contacts, a list of impermissible contacts, or a grey-list of contacts. Each contact lists may include a list of third-party device identifiers or third-party users. A third-party device identifier may correspond to a phone number, a Public Land Mobile Network ID (PLMN ID), a Mobile Station International Subscriber Directory Number (MSISDN), or an International Mobile Subscriber Identity (IMSI), or any combination thereof. Each listing of a third-party user may include a listing of third-party devices associated with the third-party users, and in some instances, a corresponding voice-biometric template of the third-party user.

The list of permissible contacts may include a list of third-party devices with which a client is permitted to engage, without restriction. In some cases, the CPC system may selectively monitor real-time communication sessions between a client device and a third-party device listed on the list of permissible contacts for the purpose of verifying a third-party user identity. For example, in some cases, an ill-intentioned third-party may initiate a real-time communication session from a phone number that appears to be listed on a list of permissible contacts, despite the real-time communication having been initiated from a different telephone number. This practice, also known as caller ID spoofing, may provide the client with a misplaced assurance of an identity of the third-party and/or origin of the real-time communication session. Thus, the CPC system may be configured to confirm, via a voice-biometric analysis, an identity of a third-party user using a third-party device that appears to be listed on the list of permissible contacts.

The list of impermissible contacts may include a list of third-party devices and third-party users that a client is not permitted to engage in a real-time communication session. The grey-list of contacts may include third-party devices and third-party users with whom a client is permitted to have limited communications. By way of example, the CPC system may establish a grey-list of contacts based on one or more communications rules that limit communications based on a permissible number of minutes for voice communications over a predetermined time period (i.e. billing cycle of a telecommunication service account), a permissible number of text messages over a predetermined time period (i.e. billing cycle of a telecommunication service account), a time of day, a day of the week, a geographic location of the client at a point in time that the real-communication session was initiated, or any combination thereof.

The grey-list of contacts may include third-party devices and third-party users with whom a client is permitted to have limited communications. By way of example, the CPC system may establish a grey-list of contacts based on one or more communications rules that limit communications with one or more third-party identities based on a permissible number of minutes for voice communications over a predetermined time period (i.e. billing cycle of a telecommunication service account), a permissible number of text messages over a predetermined time period (i.e. billing cycle of a telecommunication service account), a time of day, a day of the week, a geographic location of the client device at a point in time that the real-communication session was initiated, or any combination thereof.

Further, the CPC system may selectively monitor real-time communication sessions based at least in part on a triggering event. The triggering event may relate to a condition that occurs at the point in time that the real-time communication session is initiated. The condition may correspond to one or more of a time of day, a day of the week, a geographic location of the client device, or any combination thereof. A triggering event may also include a determination that a real-time communication session has been initiated by an unknown third-party device or third-party user that is not listed on a contact list.

It is noteworthy that the term "client," as used herein, may refer to one or more of a PAH or a SAH. Further, the term "third-party," as used herein, may refer to individuals with whom a client (i.e. PAH and/or SAH) engages in a real-time communication session.

During the process of monitoring a real-time communication session, the CPC system may retrieve communication session data from the client device of the client account. The communication session data may include audio data associated with a voice communication, text data associated with a text communication (i.e. Short Message Service (SMS) or Multimedia Message Service (MMS)), along with corresponding session metadata. The session metadata may include one or more of a client identifier associated with the client device and a third-party identifier associated with the third-party device interacting with the client device.

In this example, the CPC system may analyze the session metadata to identify the client device and the third-party device. The CPC system may further use the audio data to perform a voice biometric analysis of a client voice associated with the client device and a third-party voice associated with the third-party device.

The session metadata may also include sensor data from the client device. For example, the client device may be equipped with a Global Positioning System (GPS) sensor. In this example, the CPC system may be configured to analyze sensor data from the GPS sensor to determine a geographic location of the client device.

In various examples, the CPC system may determine whether a real-time communication session is a nuisance or a restricted communication, based at least in part on a set of communication privilege rules. The CPC system may generate the set of communication privilege rules based on client input from a PAH or delegated user of the client account. The CPC system may configure the set of communication privilege rules to infer that a real-time communication session is a nuisance or restricted communication based on a third-party identity that is associated with the third-party device interacting with the client device. In this example, the third-party identity may be compared with a list of contacts (i.e. a list of permissible contacts, a list of impermissible contacts, and/or grey-list of contacts) with whom real-time communications are permitted and/or restricted.

Alternatively, or additionally, the CPC system may configure the set of communication privilege rules that may determine that a real-time communication session is a nuisance or restricted communication independent of a third-party identity, and instead may be dependent on restriction parameters such as a geographic location of the client device at the time of the real-time communication session, a time of day, a day of the week, a first allotment of time usage for voice communications associated with the client device or client account, or a second allotment of a number of text-based messages associated with the client device or client account.

In this way, the CPC system may generate a communication integrity score for the real-time communication session that quantifies a likelihood that the real-time communication session is a nuisance or a restricted communication, based at least in part on the set of communication privilege rules.

In a non-limiting example, the CPC system may configure a set of communication privilege rules that determine that a real-time communication session is a nuisance or a restricted communication, based on a third-party identity of the third-party device interacting with the client device during the real-time communication session. In this example, the CPC system may determine that the third-party identity associated with the third-party device is listed on a list of permissible contacts or a grey-list of contacts. Regarding the grey-list of contacts, the CPC system may use the session metadata associated with the real-time communication session to determine whether the real-time communication session satisfies communication rules that permit or limit communications (i.e. a time of day, a day of the week, a geographic location of the client device, and/or so forth). Therefore, in response to determining that the third-party identity is listed on the list of permissible contacts or in response to determining that the real-time communication session is a permissible communication based on the grey-list of contacts, the CPC system may generate a communication integrity score that is greater than or equal to the predetermined integrity threshold. In this way, the CPC system is inferring that the real-time communication session is unlikely to be a nuisance or a restricted communication, and in doing so, the CPC system may permit the real-time communication session to continue.

In another example, the CPC system may determine that the third-party identity associated with the third-party device is listed on a list of impermissible contacts or determine that the real-time communication is an impermissible communication based on the grey-list of contacts. The CPC system may then generate a communication integrity score that is less than the predetermined integrity threshold, based at least in part on the set of communication privilege rules. In this way, the CPC system is inferring that the real-time communication session is likely to be a nuisance or a restricted communication.

In response to the communication integrity score being less than the predetermined integrity threshold, the CPC system may selectively terminate the real-time communication session irrespective of whether the client device or the third-party device initiated the real-time communication session, based at least in part on the set of communication privilege rules. The CPC system may also transmit a notification to a trusted device associated with the client account indicating that the real-time communication session has been terminated.

Alternatively, or additionally, the CPC system may generate and deploy notification data to a trusted device in response to the communication integrity score being greater than a predetermined integrity threshold, based at least in part on the set of communication privilege rules. The notification data may include computer-executable instructions that automatically present one or more selectable options on a display of the trusted device. The one or more selectable options may relate to controlling the real-time communication session. For instance, the one or more selectable options may include permitting the real-time communication session to continue, terminating the real-time communication session, or re-directing the real-time communication session from the client device to a trusted device. The one or more selectable options may also include a prompt for a client input of a device identifier that is associated with an additional device that is to receive a re-direct of the real-time communication session from the client device. The device identifier may correspond to a phone number or other pertinent identifier that is intended to identify the additional device to the CPC system.

Moreover, the CPC system may be configured to automatically perform one or more actions in response to the communication integrity score being less than one or more predetermined integrity thresholds, based at least in part on the set of communication privilege rules. By way of example, the CPC system may determine that the communication integrity score is less than a first predetermined integrity threshold but greater than a second predetermined integrity threshold. In doing so, the CPC system may transmit notification data to a trusted device that includes one or more selectable options to control the real-time communication session. Alternatively, the CPC system may determine that the communication integrity score is less than a first and second predetermined integrity threshold, and in doing so, automatically terminate an ongoing real-time communication session. In this latter example, the CPC system may transmit notification data to a trusted device that presents a notification that the real-time communication session has been terminated. In various examples, the one or more predetermined integrity thresholds may be set by a PAH of a client account, an operator of the CPC system, or an administrator of a telecommunication service provider.

Further, the term "techniques," as used herein, may refer to system(s), method(s), computer-readable instruction(s), module(s), algorithms, hardware logic, and/or operation(s) as permitted by the context described above and through the document.

FIG. 1 illustrates a computing environment 100 of a telecommunication network 102 that facilitates an operation of a Communication Privilege Control (CPC) system 104. The CPC system 104 may be configured to monitor a real-time communication session that involves a client device associated with a client account and further detect a nuisance concern or a restricted communication.

The telecommunications network 102 may include multiple base stations, such as base station 106, as well as a core network 108 that serves one or more client device(s) 110(1)-110(N). In the illustrated example, the client device(s) 110(1)-110(N) may be associated with a client account, such as a telecommunications service account. The client account may include a plurality of clients, each of whom shares access to service features accessible via the telecommunications network 102. The service features may include various mediums of communication, such as voice communications and text communications (i.e. SMS and MMS).

In various examples, an IP Multimedia Subsystem (IMS) core 112 may reside in the core network 108. The IMS core 112 may include an application function (AF) 114, such as a Proxy Call Session Control Function (P-CSCF) 116, an Interrogating Call Session Control Function (I-CSCF) 118, and a Service Call Session Control Function (S-CSCF) 120. The P-CSCF 116 behaves like a proxy by accepting requests and serving them internally or forwarding them towards another entity, such as Enterprise Information Technology (EIT) server(s) 122. The S-CSCF 120 acts as a Session Initiation Protocol (SIP) registrar and in some cases as a SIP redirect server. The S-CSCF 120 is responsible for processing the location registration of a client device, client authentication, and call routing and processing. The I-CSCF 118 is tasked with selecting an S-CSCF 120 for serving an initial SIP request, particularly when a client device initiating the request does not know which S-CSCF 120 should receive the request.

Additionally, the core network 108 may further include a Policy and Charging Control (PCC) 124 and a gateway 126. The PCC 124 may enable detection of communication service data flow and provide parameters for policy control and/or charging control. In the illustrated example, the PCC 124 may include a policy engine 128, such as a Policy and Charging Rules Function (PCRF) 130, and a Home Subscriber Server (HSS) 132. The HSS 132 may be configured to authenticate an identity of a client and authorize operation of a corresponding client device on the telecommunications network 102.

Further, the gateway 126 may include one or more servers and related components that are tasked with providing connectivity between the IMS core 112, the client device(s) 110(1)-110(N) and the internet 134. More specifically, the gateway 126 may act as a point of entry and exit for data traffic.

Moreover, the core network 108 may further include one or more Enterprise Information (EIT) server(s) 122, such as but not limited to, the CPC system 104. The CPC system 104 may be configured to monitor real-time communication sessions initiated by, or received at, the client device(s) 110(1)-110(N) associated with a client account. In doing so, the CPC system 104 may infer whether the client device(s) 110(1)-110(N) may be impacted by a nuisance concern or a restricted communication.

In various examples, a CPC application may reside on each of client device(s) 110(1)-110(N) to monitor an operation of client device(s) 110(1)-110(N) and detect a real-time communication session that is initiated by the client device(s) 110(1)-110(N) or a third-party device interacting with the client device(s) 110(1)-110(N). In doing so, the CPC application may transmit an indication to the CPC system 104 indicating that a real-time communication session is in progress. In doing so, the CPC system 104 may selectively monitor the real-time communication and transmit a pull request to the client device(s) 110(1)-110(N) for communication session data associated with the real-time communication session.

Moreover, the CPC system 104 may analyze the communication session data and further generate a communication integrity score that numerically quantifies a likelihood that real-time communication session that involves the client device(s) 110(1)-110(N) may be a nuisance concern or a restricted communication. In response, the CPC system 104 may transmit notification data to a trusted device associated with the client device(s) 110(1)-110(N). The notification data may alert the trusted device of the nuisance concern or restricted communication. Alternatively, or additionally, the notification data may present the trusted device with one or more selectable options to terminate the real-time communication session, permit the real-time communication session to continue, or re-direct the real-time communication session from the client device(s) 110(1)-110(N) to the trusted device. In some examples, the CPC system 104 may transmit communication session modification data that automatically terminates the real-time communication session or redirects the real-time communication session from the client device(s) 110(1)-110(N) to the trusted device. It is noteworthy that the trusted device may correspond to one of the client device(s) 110(1)-110(N).

In the illustrated example, the telecommunications network 102 may provide telecommunications and data communications in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), and/or so forth. The computing environment 100 may include a core network 108. The core network 108 may provide telecommunication and data communication services to multiple client devices, such as a 3G-compatible client device and an LTE-compatible client device, collectively referred to as client device(s) 110(1)-110(N). The client device(s) 110(1)-110(N) may correspond to any sort of electronic device operating on the telecommunications network, such as a cellular phone, a smartphone, a tablet computer, an electronic reader, a media player, a gaming device, a personal computer (PC, a laptop computer), etc. The client device(s) 110(1)-110(N) may have a subscriber identity module (SIM), such as an eSIM, to identify the respective electronic device to a telecommunications service provider network (also referred to herein as "telecommunications network").

Additionally, the CPC system 104 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the client device(s) 110(1)-110(N) via one or more network(s). The one or more network(s) may include public networks such as the Internet, private networks such as institutional and/or personal intranet, or some combination of private and public networks. The one or more network(s) can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, and so forth), or any combination thereof.

Figure 2:
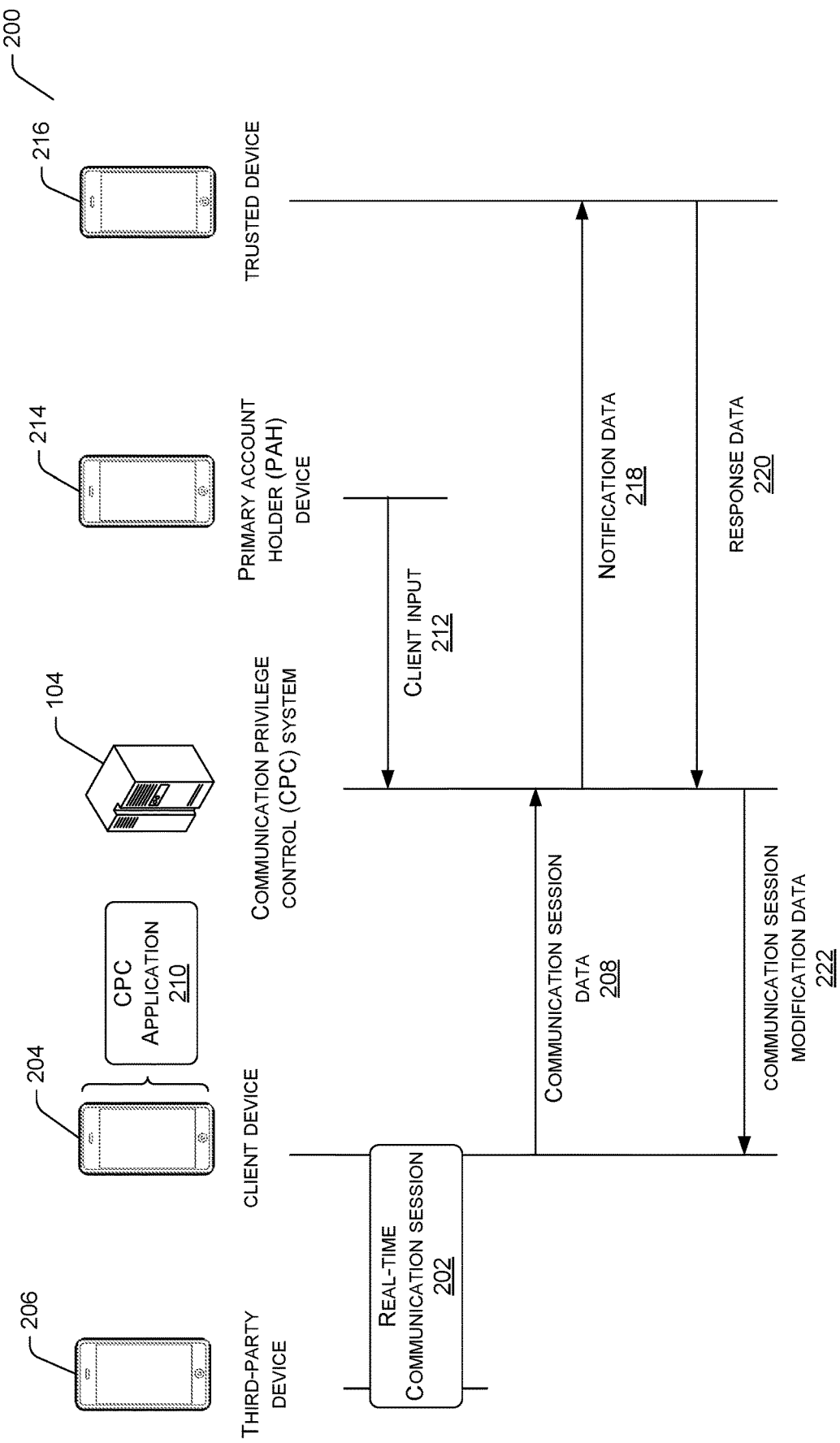
FIG. 2 illustrates a block diagram of a process for monitoring a real-time communication session between a client device of a client account and third-party device, and further detecting a nuisance concern or a restricted communication.

FIG. 2 illustrates a block diagram of a process 200 for monitoring a real-time communication session 202 between a client device 204 of a client account and third-party device 206, and further detecting a nuisance concern or a restricted communication. Client device 204 may correspond to one of the client device(s) 110(1)-110(N).

In the illustrated example, a real-time communication session 202 may be initiated by or received at, a client device 204 associated with a client account. The real-time communication session 202 may be a voice communication or a text communication (i.e. SMS or MMS) between the client device 204 and a third-party device 206.

Following the start of the real-time communication session 202, the client device 204 may transmit communication session data 208 to the Communication Privilege Control (CPC) system 104. In some examples, the CPC system 104 may receive a notification that the client device 204 is interacting with the third-party device 206 from a CPC application 210 installed on the client device 204. In this way, the CPC system 104 may elect to monitor the real-time communication session 202 based at least in part on one or more communication rules, and in doing so, pull a request from communication session data 208 from the client device 204.

The communication session data 208 may include audio data associated with a voice communication, text data associated with a text communication (i.e. SMS, MMS, or transcript of a voice communication), and session metadata. The session metadata may further include a client identifier associated with the client device 204, a third-party identifier associated with the third-party device 206 interacting with the client device, and sensor data from a GPS sensor associated with the client device 204.

Moreover, the CPC system 104 may analyze the communication session data 208 to determine whether a real-time communication session 202 is a nuisance concern or a restricted communication, based at least in part on a set of communication privilege rules. In some examples, the CPC system 104 may generate the set of communication privilege rules based on a client input 212 from a Primary Account Holder (PAH) device 214 of the client account, a delegated user that is authorized to control real-time communication sessions associated with the client device 204. The client input 212 may include one or more contact lists (i.e. permissible list of contacts, impermissible list of contacts, or a grey-list of contacts), restriction parameters that trigger control of a real-time communication session, a selection of client devices or client identities that are to be subject to control of real-time communications, and trust parameters that facilitate selection of a trusted device 216. It is noteworthy that in some embodiments, the trusted device 216 may correspond to the PAH device 214.

In various examples, the CPC system 104 may generate a communication integrity score that quantifies a likelihood that the real-time communication session 202 is a nuisance concern or a restricted communication. In response to determining that the communication integrity score is less than one or more predetermined integrity thresholds, the CPC system 104 may generate and deploy notification data 218 to the trusted device 216, based at least in part on the set of communication privilege rules. The notification data 218 may alert a trusted device 216 of a nuisance concern or a restricted communication, present the trusted device 216 with selectable options to control a real-time communication session 202, or alert the trusted device 216 that a real-time communication 202 has been automatically controlled.

In response to the CPC system 104 deploying notification data 218 that presents the trusted device 216 with one or more selectable options to control the real-time communication session 202, the trusted device 216 may transmit response data 220 that includes a selection of one of the one or more selectable options. The one or more selectable options may include permitting the real-time communication session to continue, terminating the real-time communication session, or re-directing the real-time communication session from the client device to a trusted device.

Further, the CPC system 104 may generate and deploy communication session modification data 222 to the client device, based at least in part on the set of communication privilege rules or the response data 220, or both. The communication session modification data 222 may include computer-executable instructions that automatically terminates the real-time communication session 202 between the client device 204 and the third-party device 206 or re-directs the real-time communication session 202 from the client device 204 to the trusted device 216.

Figure 3:
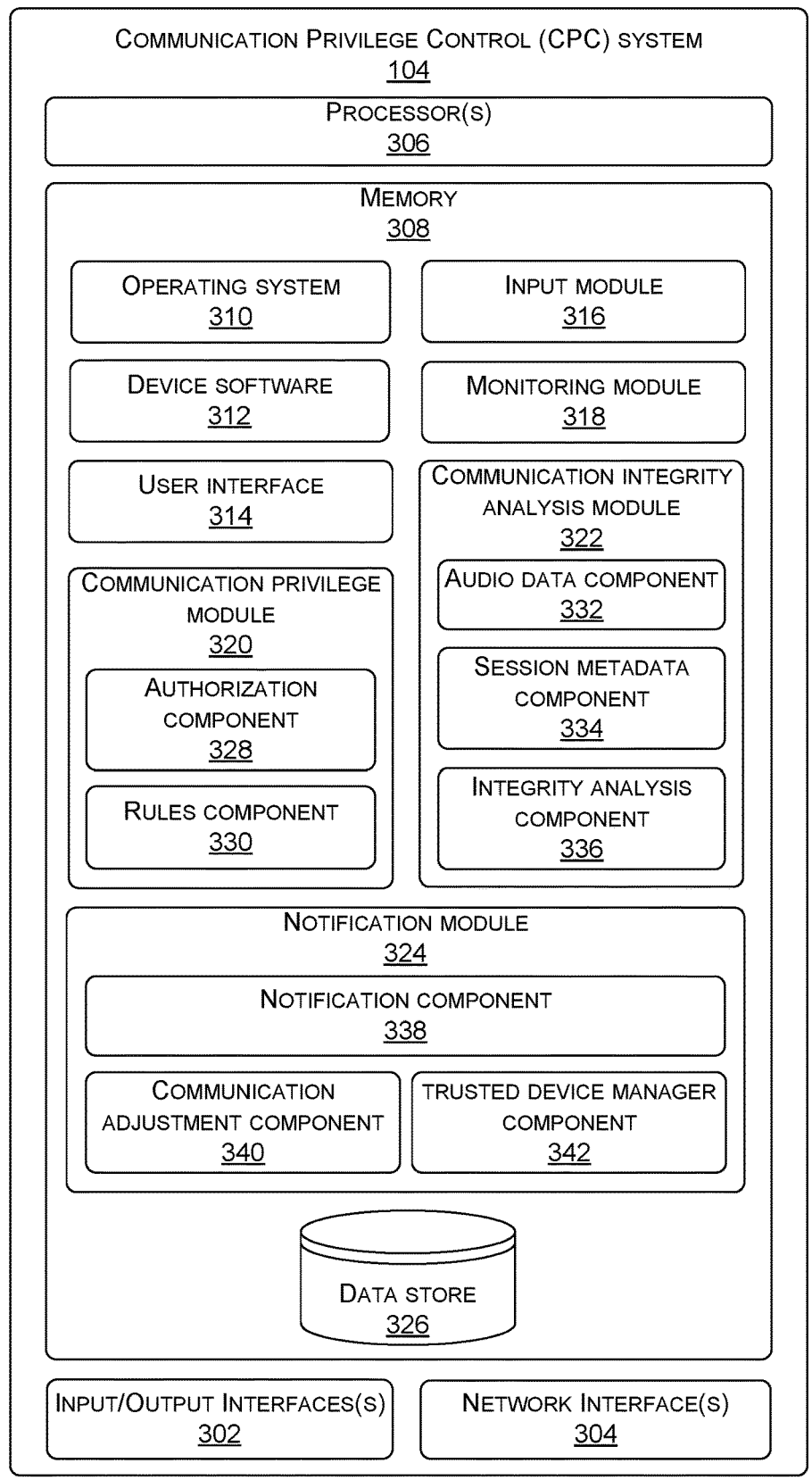
FIG. 3 illustrates a block diagram of various components of a Communication Privilege Control (CPC) system that is configured to interact with one or more client devices of a client account.

FIG. 3 illustrates a block diagram of various components of a Communication Privilege Control (CPC) system that is configured to interact with one or more client devices of a client account. In various examples, the CPC system 104 may monitor a real-time communication session that involves a client device associated with a client account and further detect a nuisance concern or a restricted communication. In doing so, the CPC system 104 may automatically intercept the real-time communication session and selectively terminate or re-direct the real-time communication session to a trusted device.

The CPC system 104 may include input/output interface(s) 302. The input/output interface(s) 302 may include any type of output interface known in the art, such as a display (e.g. a liquid crystal display), speakers, a vibrating mechanism, or a tactile feedback mechanism. Input/output interface(s) 302 also include ports for one or more peripheral devices, such as headphones, peripheral speakers, or a peripheral display. Further, the input/output interface(s) 302 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the CPC system 104 may include network interface(s) 304. The network interface(s) 304 may include any sort of transceiver known in the art. For example, the network interface(s) 304 may include a radio transceiver that performs the function of transmitting and receiving radio frequency communications via an antenna. In addition, the network interface(s) 304 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 304 may include wired communication components, such as an Ethernet port or a Universal Serial Bus (USB).

Further, the CPC system 104 may include one or more processor(s) 306 that are operably connected to memory 308. In at least one example, the one or more processor(s) 306 may be a central processing unit(s) (CPU), graphics processing unit(s) (GPU), or both a CPU and GPU or any other sort of processing unit(s). Each of the one or more processor(s) 306 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 306 may also be responsible for executing all computer applications stored in the memory, which can be associated with common types of volatile (RAM) and/or non-volatile (ROM) memory.

In some examples, memory 308 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 308 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 308 may include an operating system 310, device software 312, a user interface 314, an input module 316, a monitoring module 318, a communication privilege module 320, a communication integrity analysis module 322, a notification module 324, and a data store 326. The operating system 310 may be any operating system capable of managing computer hardware and software resources. The operating system 310 may include an interface layer that enables applications to interface with the input/output interface(s) 302 and the network interface(s) 304. The interface layer may comprise public APIs, private APIs, or a combination of both. Additionally, the operating system 310 may include other components that perform various other functions generally associated with an operating system.

The device software 312 may include software components that enable the CPC system 104 to perform functions, such as basic input/output system (BIOS), Boot ROM, or a bootloader that boots up the CPC system 104 and executes the operating system 310 following power-up of the CPC system 104.

The user interface 314 may enable a client, such as a PAH, or a delegated user, to provide client input and receive output from the CPC system 104. An example client input may include authentication credentials that verify that the PAH or delegated user has authority to control the real-time communications of other client devices of a client account. Client input may also include one or more contact lists (i.e. permissible list of contacts, impermissible list of contacts, or a grey-list of contacts), restriction parameters that trigger control of a real-time communication session, a selection of client devices or client identities that are to be subject to control of real-time communications, and trust parameters that facilitate selection of a trusted device. Client input may also include one or more predetermined integrity thresholds that are associated with the analysis of communication integrity scores, and a predetermined similarity threshold that is associated with the analysis of a biometric sample of a client or third-party voice relative to a registered biometric template.

The input module 316 may be configured to receive client input from a CPC application 210 that is executed on a client device. Client input may correspond to the client input received via the user interface 314.

The monitoring module 318 may be configured to monitor real-time communication sessions between a client device associated with a client account and another third-party device. Monitoring may occur on a continuous basis, per one or more contact lists (i.e. permissible list of contacts, impermissible list of contacts, or grey-list of contacts), or in response to a triggering event. Each list of contacts may include a list of third-party devices, third-party users, or a combination of both.

In response to detecting a real-time communication session between a client device and a third-party device, the monitoring module 318 may retrieve communication session data from the client device. The communication session data may include audio data associated with a voice communication, text data associated with a text communication, and corresponding session metadata.

The communication privilege module 320 may include an authorization component 328 and a rules component 330. The authorization component 328 may be configured to verify whether a client device is authorized to control the real-time communication sessions of other client devices associated with the client account. Specifically, the authorization component 328 may authenticate if an identity of the user (i.e. PAH or delegated user) has an appropriate level of authorization. Specifically, the authorization component 328 may cross-reference authentication credentials of the user with a list of authorized users that are authorized to control the real-time communication sessions associated with the client account.

The rules component 330 may employ one or more machine-learning algorithms to generate a set of communication privilege rules based at least in part on client input received via the user interface 314 and via the input module 316. More specifically, the client input may include at least one or more contact lists (i.e. permissible list of contacts, impermissible list of contacts, or a grey-list of contacts), restriction parameters that trigger control of a real-time communication session, a selection of client devices or client identities that are to be subject to control of real-time communications, and trust parameters that facilitate a selection of a trusted device.

The rules component 330 may generate a set of communication privilege rules to perform three functions; namely, determine whether a real-time communication session is a nuisance or a restricted communication; identify a trusted device for delivery of notification data; and, configure the notification data to alert the trusted device of the nuisance concern or the restricted communication, present the trusted device with selectable options to control the real-time communication session, or alert the trusted device that a real-time communication has been automatically controlled. It is noteworthy that the set of communication privilege rules that configure notification data may incorporate one or more predetermined integrity thresholds received via one of the user interface 314 or input module 316.

The communication integrity analysis module 322 may include an audio data component 332, a session metadata component 334, and an integrity analysis component 336. The audio data component 332 may interact with the monitoring module 318 to access audio data from communication session data retrieved from a client device. The audio data component 332 may further isolate biometric samples of a client voice associated with the client device and a third-party voice associated with the third-party device, and in doing so, perform a voice biometric analysis on the client's voice and the third-party's voice. It is noteworthy that the CPC system may analyze a client voice to ensure that the user of the client device is, in fact, the client and not another individual. The voice biometric analysis may include an analysis of a vocal accent, a tonality, a refraction of sound, a vocal frequency, a vocal pitch, or any combination thereof. In some examples, the audio data component 332 may identify a client or third-party based at least in part on a similarity between the biometric sample from the audio data and a registered biometric template accessible via the data store 326.

In some examples, the audio data component 332 may generate a similarity score to quantify a similarity between a biometric sample of a client's voice or third-party's voice with a corresponding client or third-party registered biometric template. In this way, the CPC system may infer that a biometric sample is associated with either a client or third-party based at least in part on the similarity score being greater than a predetermined similarity threshold. The similarity score may be alpha-numeric (i.e. 0 to 10, or A to F), descriptive (i.e. low, medium, or high), based on color, (i.e. red, yellow, or green), or any other suitable rating scale. A high similarity score (i.e. 7 to 10, high, or red) may indicate that a biometric sample likely matches a registered biometric template. Similarly, a low similarity score (i.e. 0 to 3, low, green) may indicate that a biometric sample is unlikely to match the registered biometric template. Moreover, the predetermined similarity threshold may be set by a PAH of the client account, an operator of the CPC system, or an administrator of the telecommunications service provider.

The session metadata component 334 may interact with monitoring module 318 to access session metadata from communication session data retrieved from a client device. The session metadata may include one or more of a client identifier associated with the client device, a third-party identifier associated with the third-party device interacting with the client device, and sensor data from a GPS sensor of the client device. In one example, the session metadata component 334 may analyze the sensor data from the GPS sensor to determine a geographic location of the client device during the real-time communication session.

The integrity analysis component 336 may be configured to determine whether a real-time communication session is a nuisance concern or a restricted communication, based at least in part on the set of communication privilege rules. In one example, the integrity analysis component 336 may interact with the rules component 330 to access the set of communication privilege rules. In doing so, the integrity analysis component 336 may employ one or more machine learning algorithms to analyze audio data and session metadata associated with a real-time communication session data relative to the set of communication privilege rules. In doing so, the integrity analysis component 336 may generate a communication integrity score that quantifies a likelihood that a real-time communication session is a nuisance or a restricted communication, based at least in part on the set of communication privilege rules.

The communication integrity score may be alpha-numeric (i.e. 0 to 10, or A to F), descriptive (i.e. low, medium, or high), based on color, (i.e. red, yellow, or green), or any other suitable rating scale. In one example, a high communication integrity score (i.e. 7 to 10, high, or red) may reflect an inference that the real-time communication session is unlikely to be a nuisance concern or a restricted communication. The integrity analysis component 336 may generate a high-level communication integrity score in response to determining that a third-party identity involved in the real-time communication session is listed on a list of permissible contacts. Moreover, the first predetermined integrity threshold described earlier may correspond to a threshold communication integrity score of 7, high, or red.

In another example, a medium-level communication integrity score (i.e. 4 to 6, medium, or yellow) may reflect an inference that the real-time communication session is likely to be a nuisance concern or a restricted communication. The integrity analysis component 336 may generate a medium-level communication integrity score in response to being unable to determine a third-party identity that is involved in the real-time communication session. Further, the second predetermined integrity threshold described earlier may correspond to a medium communication integrity score of 6, medium, or yellow.

In contrast, a low-level communication integrity score (i.e. 0 to 3, low, or green) may reflect a high degree of certainty that the real-time communication session is a nuisance or restricted communication. In this example, the integrity analysis component 336 may generate a low-level communication integrity score in response to determining that a third-party identity involved in the real-time communication session is listed on a list of impermissible contacts.

The notification module 324 may include a notification component 338, a communication adjustment component 340, and a trusted device manager component 342. The notification component 338 may be configured to generate notification data for delivery to a trusted device, based at least in part on the communication integrity score and the set of communication privilege rules. The notification component 338 may be configured to generate and deploy one of three different types of the notification data based at least in part on the magnitude of the communication integrity score. In one example, the CPC system 104 may receive one or more predetermined integrity thresholds, each of which triggers the notification component 338 to generate and deploy a different type of notification data. For example, the CPC system 104 may receive via the user interface 314 or the input module 316, a first predetermined integrity threshold, a second predetermined integrity threshold, and a third predetermined integrity threshold, whereby the first predetermined integrity threshold is less than the second predetermined integrity threshold, and the second predetermined integrity threshold is less than the third predetermined integrity threshold. Any number of predetermined integrity thresholds are possible.

In response, the notification component 338 may generate and deploy a first notification data for real-time communication sessions with a communication integrity score that is between the second and third predetermined integrity thresholds, based at least in part on the set of communication privilege rules. The first notification data may include computer-executable instructions that present an alert on a display of a trusted device indicating that a client device is impacted by a nuisance concern or a restricted communication.

Further, the notification component 338 may generate and deploy a second notification data for real-time communication sessions with a communication integrity score that is between the first and second predetermined integrity thresholds, based at least in part on the set of communication privilege rules. The second notification data may include computer-executable instructions that present an alert on a display of the trusted device along with one or more selectable options. The alert may indicate that a client device is impacted by a nuisance concern or a restricted communication. The one or more selectable options may terminate the real-time communication session, permit the real-time communication session to continue, or re-direct the real-time communication session from the client device to the trusted device.

Moreover, the notification component 338 may generate and deploy a third notification data for real-time communication sessions with a communication integrity score that is less than the first predetermined integrity threshold, based at least in part on the set of communication privilege rules. The third notification data may include computer-executable instructions that present an alert on a display of the trusted device indicating that the real-time communication session that involved a client device has been automatically terminated.

The communication adjustment component 340 may be configured to generate communication session modification data for delivery to a client device, based at least in part on the set of communication privilege rules and a corresponding communication integrity score. The communication session modification data may include computer-executable instructions that automatically terminate a real-time communication session or re-direct the real-time communication session from the client device to a trusted device.

In one example, the communication adjustment component 340 may generate and deploy the communication session modification data to the client device based on a response from a trusted device to the one or more selectable options presented via the second notification data described above. In another example, the communication adjustment component 340 may generate and deploy the communication session modification data to the client device based on a communication integrity score being less than a first predetermined integrity threshold, as described above with reference to the third notification data.

Further, the trusted device manager component 342 may be configured to selectively transmit notification data to one or more trusted devices, based at least in part on the set of communication privilege rules.

The data store 326 may be configured to store one or more contact lists (i.e. list of permissible contacts, list of impermissible contacts, and a grey-list of contacts), voice biometric templates associated with clients of a client account, voice biometric templates associated with third-parties that interact with the clients during a real-time communication session, and client profile data that indicates a list of authorized users that are authorized to control real-time communication sessions of clients associated with a client account.

Figure 4:
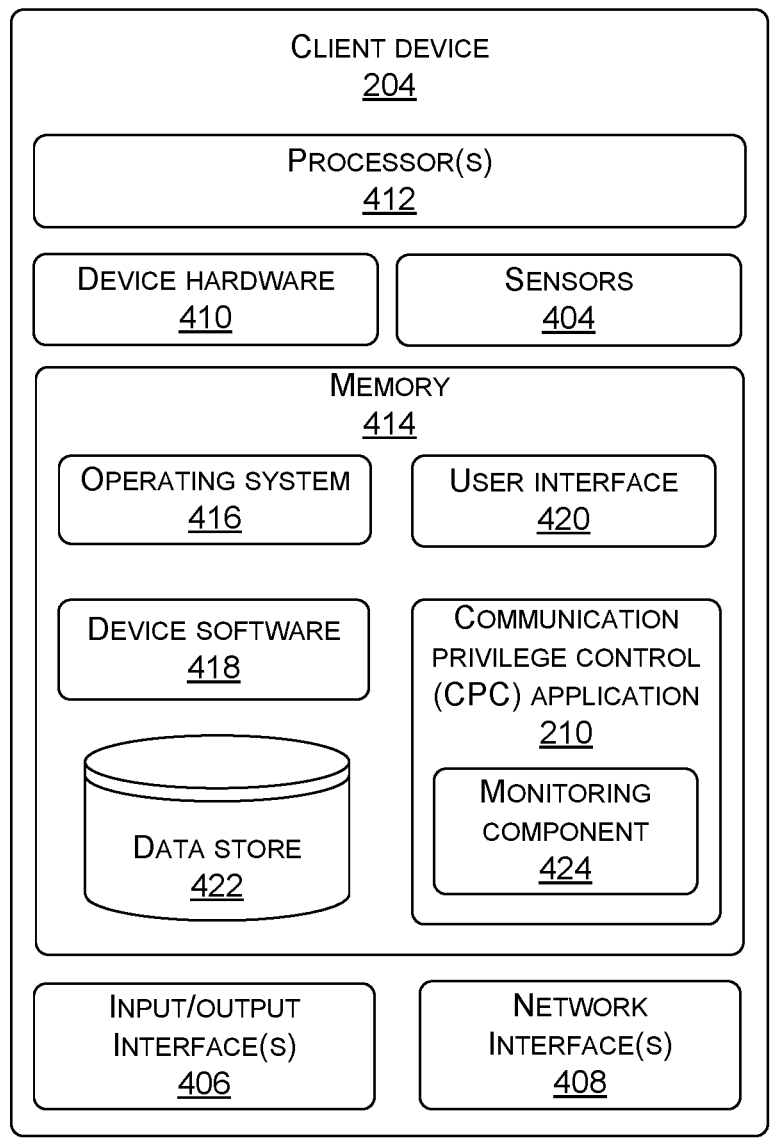
FIG. 4 illustrates a block diagram of various components of a client device configured to interact with the Communication Privilege Control (CPC) system.

FIG. 4 illustrates a block diagram of various components of a client device configured to interact with the Communication Privilege Control (CPC) system. In various examples, the CPC system 104 may be configured to detect and monitor real-time communication sessions initiated by or received at, the CPC system 104. The CPC system 104 may be further configured to compile communication session data for transmission to the CPC system 104 for further analysis, and in some instances, intervention.

In the illustrated example, the CPC system 104 may include sensor(s) 404. The sensor(s) 404 may include a Global Positioning System (GPS) sensor. Further, the CPC system 104 may include input/output interface(s) 406. The input/output interface(s) 406 may include any type of output interface known in the art, such as a display (e.g. a liquid crystal display), speakers, a vibrating mechanism, or a tactile feedback mechanism. Input/output interface(s) 406 also include ports for one or more peripheral devices, such as headphones, peripheral speakers, or a peripheral display. Further, the input/output interface(s) 406 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the CPC system 104 may include network interface(s) 408. The network interface(s) 408 may include any sort of transceiver known in the art. For example, the network interface(s) 408 may include a radio transceiver that performs the function of transmitting and receiving radio frequency communications via an antenna. In addition, the network interface(s) 408 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 408 may include wired communication components, such as an Ethernet port or a Universal Serial Bus (USB).

Moreover, the CPC system 104 may include device hardware 410. The device hardware 410 may include hardware that is typically located in a mobile telecommunication device. For example, the device hardware 410 may include signal converters, transceivers, antennas, hardware decoders and encoders, graphics processors, a Subscriber Identity Module (SIM) card slot, and/or the like that enables the CPC system 104 to execute applications and provide telecommunication and data communication functions. The SIM may be an integrated circuit chip that is inserted into the SIM card slot of the CPC system 104 or an embedded SIM that is hardwired into the circuit board of the CPC system 104.

Further, the CPC system 104 may include one or more processor(s) 412 that are operably connected to memory 414. The one or more processor(s) 412 may be similar to the one or more processor(s) 306 and the memory 414 may be similar to the memory 308.

In the illustrated example, the memory 414 may include an operating system 416, device software 418, a user interface 420, a Communication Privilege Control (CPC) application 210, and a data store 422. The operating system 416 may be similar to the operating system 310 and the device software 418 may be similar to the device software 312.

The user interface 420 may enable a client (i.e. PAH or a delegated user) to provide client input and receive output from the CPC system 104. Example client input may include one or more contact lists (i.e. permissible list of contacts, impermissible list of contacts, or a grey-list of contacts), restriction parameters that trigger control of a real-time communication session, a selection of client devices or client identities that are to be subject to control of real-time communications, and trust parameters that facilitate selection of a trusted device. Another example input may include authentication credentials that verify that a PAH or delegated user has authority to control the real-time communications of other client devices associated with a client account.

Example output, received from the CPC system, may include a notification alert of a nuisance concern or a restricted communication impacting a client device or one or more selectable options to control a real-time communication session of a client device. In the latter example, an additional client input may correspond to a selection of one of the one or more selectable options to control the real-time communication session. The CPC application 210 may be configured to transmit client input received via the user interface 420 of the CPC system 104 to the input module 316 of the CPC system 104.

Moreover, the CPC application 210 may be further configured to generate communication session data for each real-time communication session initiated by or received at, the CPC system 104. Each communication session data may include audio data associated with a voice communication, text data associated with a text communication (i.e. SMS, MIMS, or transcript of a voice communication), and session metadata. The session metadata may further include a client identifier associated with the client device, a third-party identifier associated with the third-party device interacting with the client device, and sensor data from the sensor(s) 404 of the CPC system 104.

In various examples, the CPC application 210 may include a monitoring component 424 that is substantially similar to the monitoring module 318 of the CPC system 104. By way of example, the monitoring component 424 may determine whether to selectively monitor a real-time communication session that is initiated by or received at, the CPC system 104, based on one or more contact lists (i.e. list of permissible contacts, list of impermissible contacts, or list of grey-list contacts) and/or triggering events. Alternatively, the CPC application 210 may generate communication session data for substantially all real-time communication sessions initiated by or received at, the CPC system 104. The CPC application 210 may transmit each communication session data to the CPC system 104, at which point the CPC system 104 may determine whether to selectively monitor each real-time communication session based on the one or more contact lists and/or triggering events.

The data store 422 may include a repository of client profile data and historical instances of real-time communication sessions (i.e. audio data, text data, and session metadata) initiated by, or received by, the CPC system 104. In some examples, the data store 422 may further include the one or more contact lists for embodiments in which the CPC application 210 includes a monitoring component 424.

FIGS. 5 through 8 present processes 500 through 800 that relate to operations of the Communication Privilege Control (CPC) system. Each of processes 500 through 800 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500 through 800 are described with reference to the computing environment 100 of FIG. 1.

Figure 5:
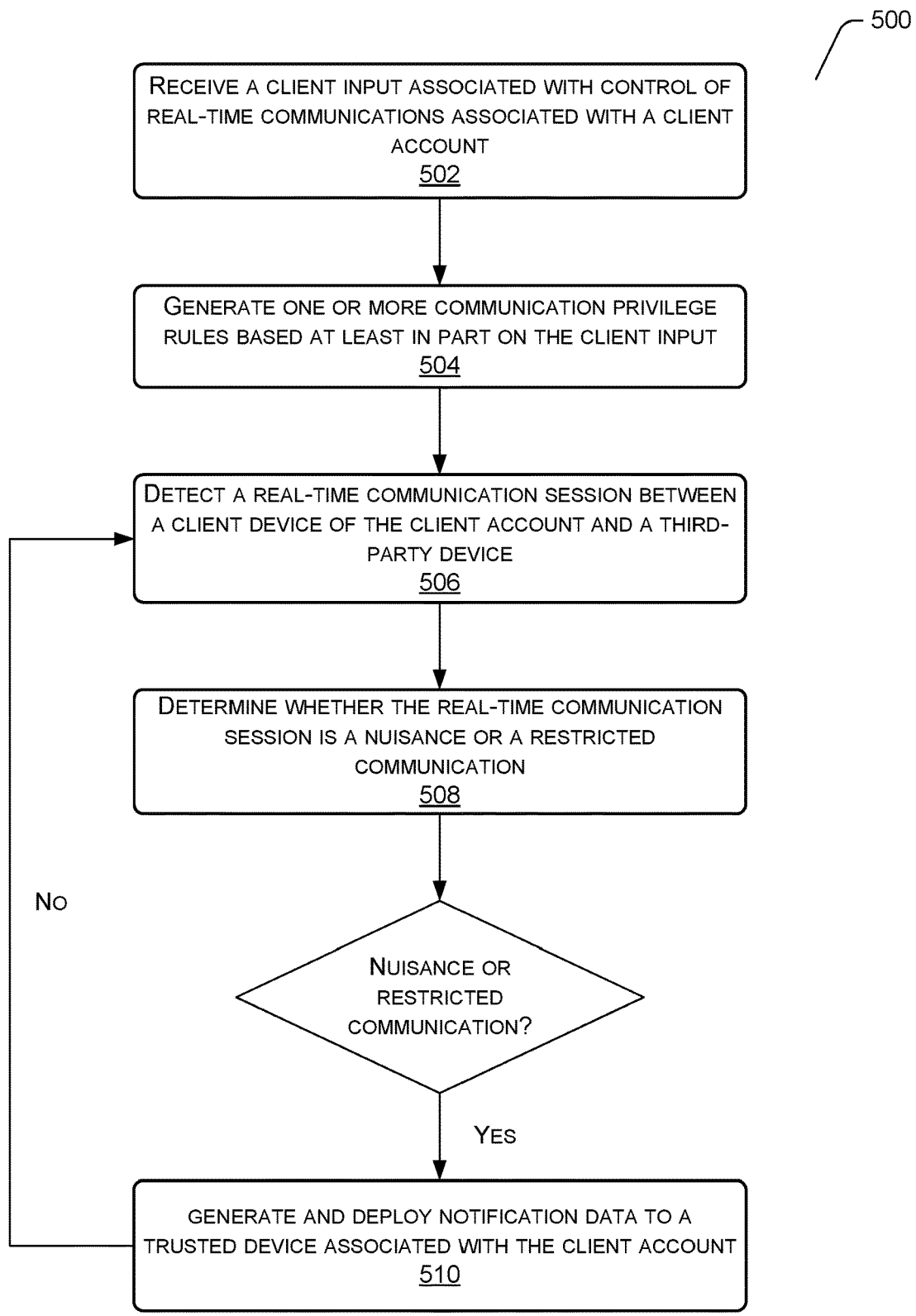
FIG. 5 illustrates a process for generating communication privilege rules for control of real-time communications associated with a client account.

FIG. 5 illustrates process 500 for generating communication privilege rules for control of real-time communications associated with a client account. Communication privilege rules may be associated with a select number of clients, or a client account, generally. In one example, the CPC system may generate communication privilege rules that permit a real-time communication session to continue. In a second example, the CPC system may generate communication privilege rules that cause the CPC system to interact with a trusted device to control a real-time communication session. In a third example, the CPC system may generate communication privilege rules that automatically terminate or re-direct a real-time communication session from a client device to a trusted device.

At 502, the CPC system may receive a client input for control of real-time communications associated with a client account. The client input may further include one or more restriction parameters that are intended to trigger control of a real-time communication session for one or more client devices associated with the client account. The restriction parameters may include at least one of a geographic location of the client device, a time of day, a day of the week, a first allotment of time usage for voice communications associated with the client device or client account, a second allotment of a number of text-based messages associated with the client device or client account, or one or more lists of contacts. The one or more lists of contacts may include a first list of permissible contacts, a second list of impermissible contacts, or a grey-list of contacts.

Moreover, the client input may also include a select number of client devices or clients that are associated with the client account. The client input may further indicate that the selection of client devices, clients, or client account generally, is to be subject to the control of real-time communications.

In some examples, the client input may further include trust parameters to facilitate selection of a trusted device in the event the CPC system determines that a real-time communication session is a nuisance or a restricted communication.

At 504, the CPC system may generate a set of communication privilege rules based at least in part on the client input. In one example, the set of communication privilege rules may involve comparing a third-party identity with a list of permissible contacts, a list of impermissible contacts, or a grey-list of contacts.

In another example, the CPC system may generate a set of communication privilege rules that are independent of a third-party identity, and are instead dependent on one or more restriction parameters, such as a geographic location of the client device, a time of day, a day of the week, a first allotment of time usage for voice communications associated with the client device or client account, or a second allotment of a number of text-based messages associated with the client device or client account.

At 506, the CPC system may detect a real-time communication session between a client device of the client account and a third-party device. In doing so, the CPC system may retrieve communication session data from the client device that includes audio data associated with a voice communication and session metadata.

The CPC system may detect the real-time communication session based on monitoring one or more client devices associated with a client account. Monitoring may occur on a continuous basis, per a predetermined list of contacts, or in response to a triggering event. The list of contacts may include a list of permissible contacts, a list of impermissible contacts, or a grey-list of contacts.

At 508, the CPC system may determine whether the real-time communication session is a nuisance or a restricted communication, based at least in part on the set of communication privilege rules. In doing so, the CPC system may generate a communication integrity score that quantifies a likelihood that the real-time communication session is a nuisance or a restricted communication.

At 510, the CPC system may determine that the communication integrity score is less than a predetermined integrity threshold. In this way, the CPC system is inferring that the real-time communication session is likely a nuisance or a restricted communication.

Therefore, the CPC system may generate notification data for transmission to a trusted device associated with the client account, based at least in part on the set of communication privilege rules. More specifically, the CPC system may configure communication privilege rules to generate and deploy notification data to a trusted device, based at least in part on the magnitude of the communication integrity score. For example, the CPC system may configure the notification data to alert a trusted device of a nuisance concern or a restricted communication, present the trusted device with selectable options to control a real-time communication session, or alert the trusted device that a real-time communication has been automatically controlled.

Alternatively, the CPC system may determine that the communication integrity score is greater than or equal to the predetermined integrity threshold. In this example, the CPC system is inferring that the real-time communication session is unlikely to be a nuisance or a restricted communication. Therefore, process 500 may return to step 506, and the CPC system may continue to detect a real-time communication session between a client device of the client account and a third-party device.

Figure 6:
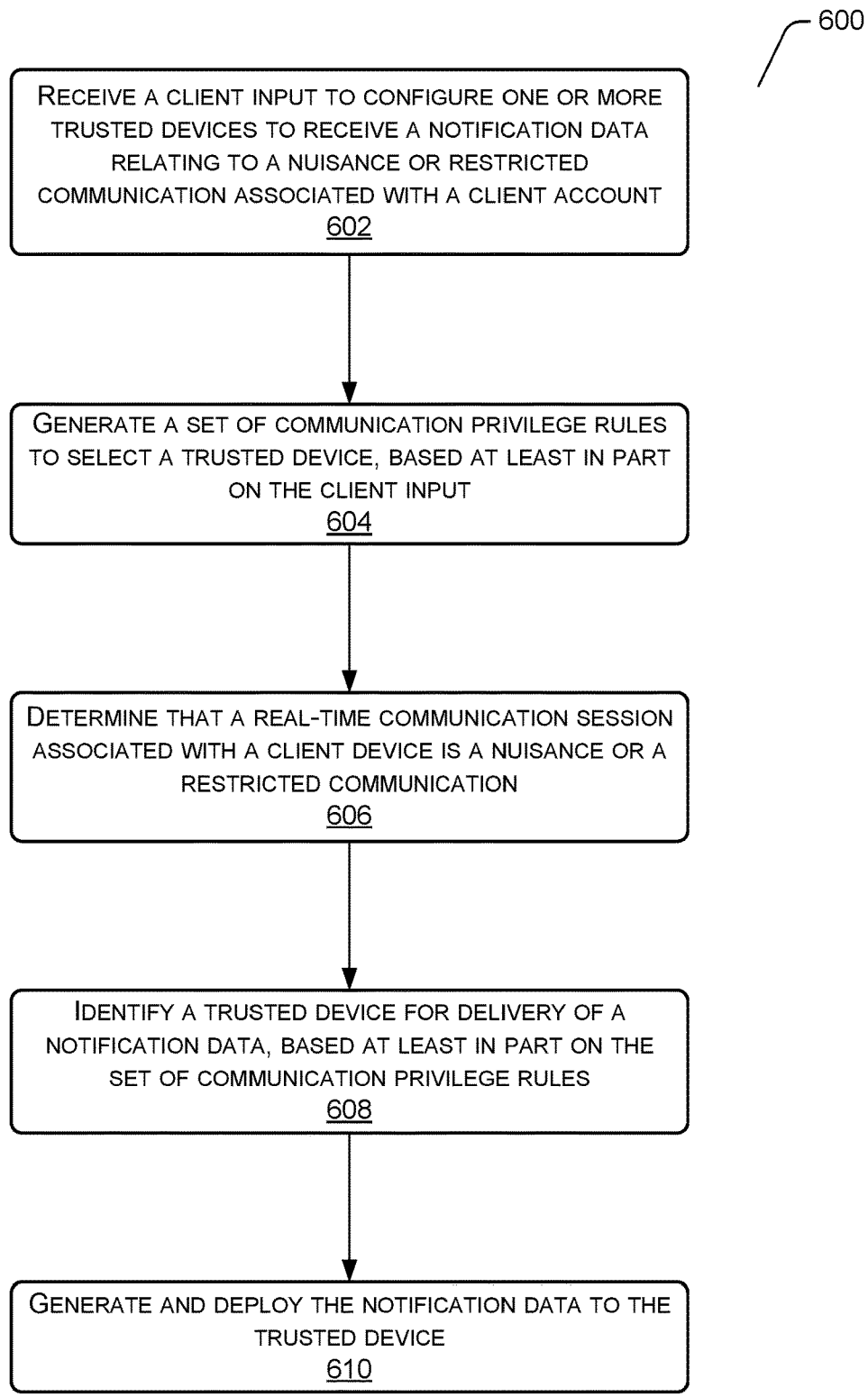
FIG. 6 illustrates a process for selecting a trusted device to receive notification data that is associated with a nuisance or restricted communication.

FIG. 6 illustrates process 600 for selecting a trusted device to receive notification data that is associated with a nuisance or restricted communication. The trusted device may be associated with a PAH of the client. Alternatively, or additionally, the PAH may delegate permissions to a trusted device that is associated with a different user to receive such notification data.

At 602, the CPC system may receive a client input to configure one or more trusted devices to receive notification data relating to a nuisance or restricted communication associated with a client account. In one example, the client input may include one or more trust parameters that correspond to variables used to select a trusted device from a group of trusted devices.

At 604, the CPC system may generate a set of communication privilege rules to select a trusted device, based at least in part on the client input. The selection of the trusted device may be based on a geographic proximity of the trusted device to a client device interacting in a real-time communication session, a time of day, a day of the week, or a third-party identifier associated with the real-time communication session. In some examples, the set of communication privilege rules may associate a particular trusted device with a particular client identifier, or a magnitude, or a range in magnitude of a communication integrity score.

It is noteworthy that the set of communication privilege rules used to select the trusted device may be the same set of communication privilege rules that are used to determine whether a real-time communication session is a nuisance or a restricted communication. This is mainly because both analyses are dependent on similar variables.

At 606, the CPC system may determine that a real-time communication session associated with a client device is a nuisance or a restricted communication, based at least in part on the set of communication privilege rules. In other words, the CPC system may detect a real-time communication session involving a client device of a client account and further determine that the communication integrity score for the real-time communication session is less than a predetermined integrity threshold.

At 608, the CPC system may identify a trusted device for delivery of notification data, based at least in part on the set of communication privilege rules. The selection of the trusted device may be based on attributes of the real-time communication session that correlate with the trust parameters used to generate the set of communication privilege rules. For example, the selection of the trusted device may be based on a geographic proximity of the trusted device to a client device interacting in a real-time communication session, a time of day, a day of the week, and/or so forth.

At 610, the CPC system may generate and deploy notification data to the trusted device, based at least in part on the set of communication privilege rules. The CPC system may configure the notification data to alert a trusted device of a nuisance concern or a restricted communication, present the trusted device with selectable options to control a real-time communication session, or alert the trusted device that a real-time communication has been automatically controlled.

Figure 7:
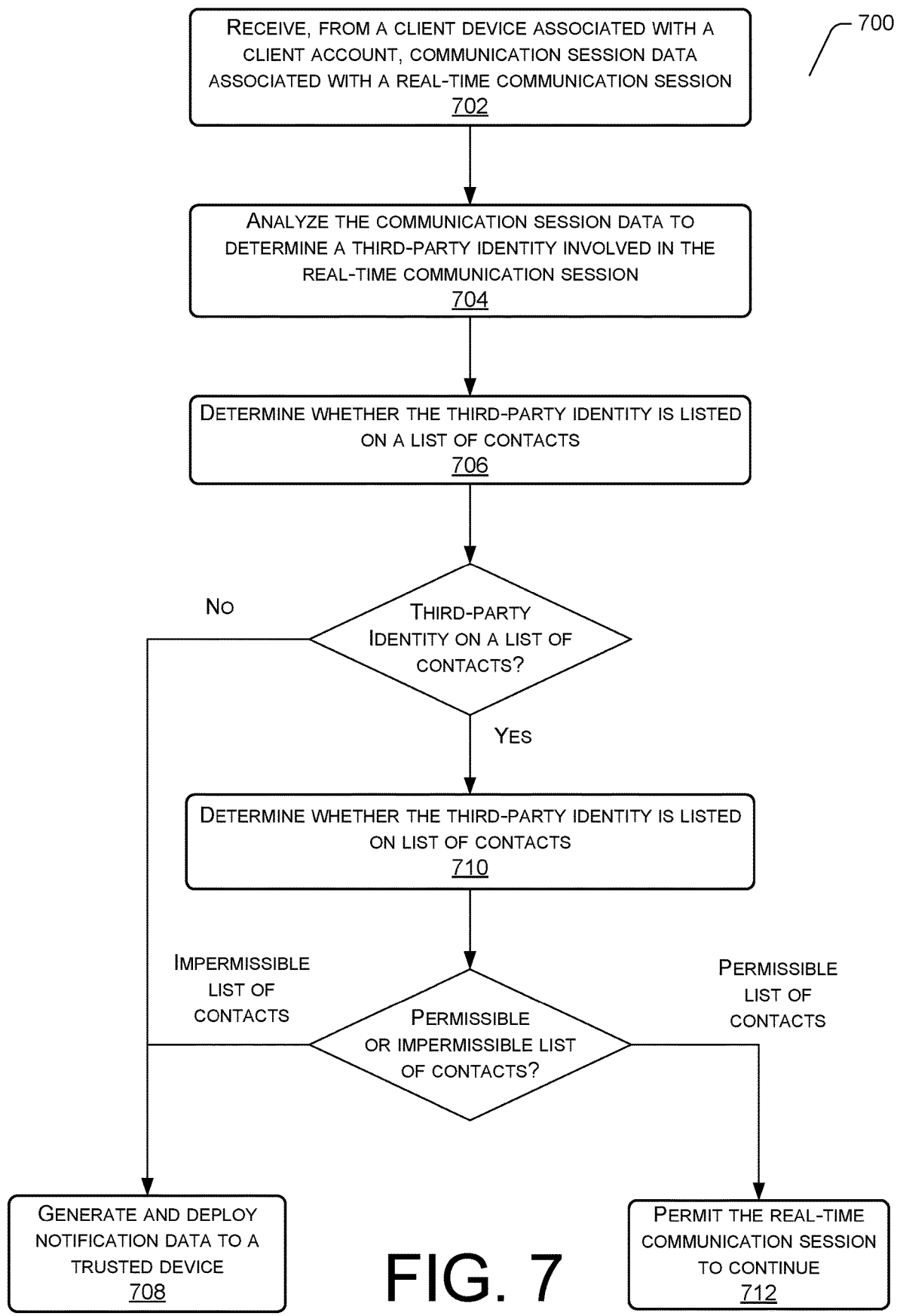
FIG. 7 illustrates a process for analyzing a real-time communication session associated with a client account relative to a list of permissible contacts and a list of impermissible contacts.

FIG. 7 illustrates a process 700 for analyzing a real-time communication session associated with a client account relative to a list of permissible contacts and a list of impermissible contacts. Moreover, process 700 further describes transmitting notification data to a trusted device based on an inferred nuisance or restricted communication. The real-time communication session may be a voice communication or a text communication.

At 702, the CPC system may receive communication session data from a client device associated with a client account. The communication session data may include audio data associated with a voice communication, text data associated with a text communication, and session metadata.

In one example, the CPC system may retrieve the communication session data in response to monitoring the client device. Monitoring may occur on a continuous basis, per a predetermined list of contacts, or in response to a triggering event. The predetermined list of contacts may include a list of permissible contacts and a list of impermissible contacts.

At 704, the CPC system may analyze the communication session data to determine a third-party identity involved in the real-time communication session. In one example, the CPC system may determine the third-party identity using the session metadata. The session metadata may include a third-party identifier associated with the third-party device that is interacting with the client device during the real-time communication session.

In another example, the CPC system may determine the third-party identity using audio data from the communication session data. For example, the CPC system may isolate a biometric sample of the third-party's voice from the audio data, and further perform a voice biometric analysis by comparing the biometric sample of the third-party's voice with registered biometric templates of third-party voices accessible to the CPC system. Thus, the CPC system may identify the third-party based at least in part on a similarity between the biometric sample of the third-party voice and a registered biometric template.

At 706, the CPC system may determine whether the third-party identity is listed on a list of contacts accessible by the CPC system. The list of contacts may include a list of permissible contacts or a list of impermissible contacts. The list of permissible contacts may include a list of third-party users and/or third-party devices that a client associated with which the client device is permitted to engage, without restriction. The list of impermissible contacts may include a list of third-party users and/or third-party devices that the client associated with the client device is not permitted to engage.

At 708, the CPC system may determine that the third-party identity is not included in one of the lists of contacts, namely the list of permissible contacts and the list of impermissible contacts. In this example, the CPC system may infer that the third-party identity is unknown.

In this way, the CPC system may generate and deploy notification data to a trusted device, based at least in part on the set of communication privilege rules. In this example, the set of communication privilege rules may stipulate that for a subset of clients of the client account, or the client account generally, notification data is to be sent to a trusted device in response to a third-party identity being unknown.

The notification data may include computer-executable instructions that present an alert on a display of the trusted device that indicates an unknown third-party identity has engaged with the client device in a real-time communication session.

In another example, the notification data may include computer-executable instructions that present selectable options to the trusted device to selectively terminate the real-time communication, permit the real-time communication session to continue, or re-direct the real-time communication from the client device to the trusted device.

At 710, the CPC system may determine whether the third-party identity is listed on a list of contacts. The list of contacts may include a list of permissible contacts or a list of impermissible contacts.

At 712, the CPC system may determine that the third-party identity is listed on a permissible list of contacts. In doing so, the CPC system may permit the real-time communication session to continue. Alternatively, the CPC system may determine that the third-party identity is listed on an impermissible list of contacts. In this latter example, process 700 may return to step 708, and generate and deploy notification data to a trusted device, based at least in part on the set of communication privilege rules.

Figure 8:
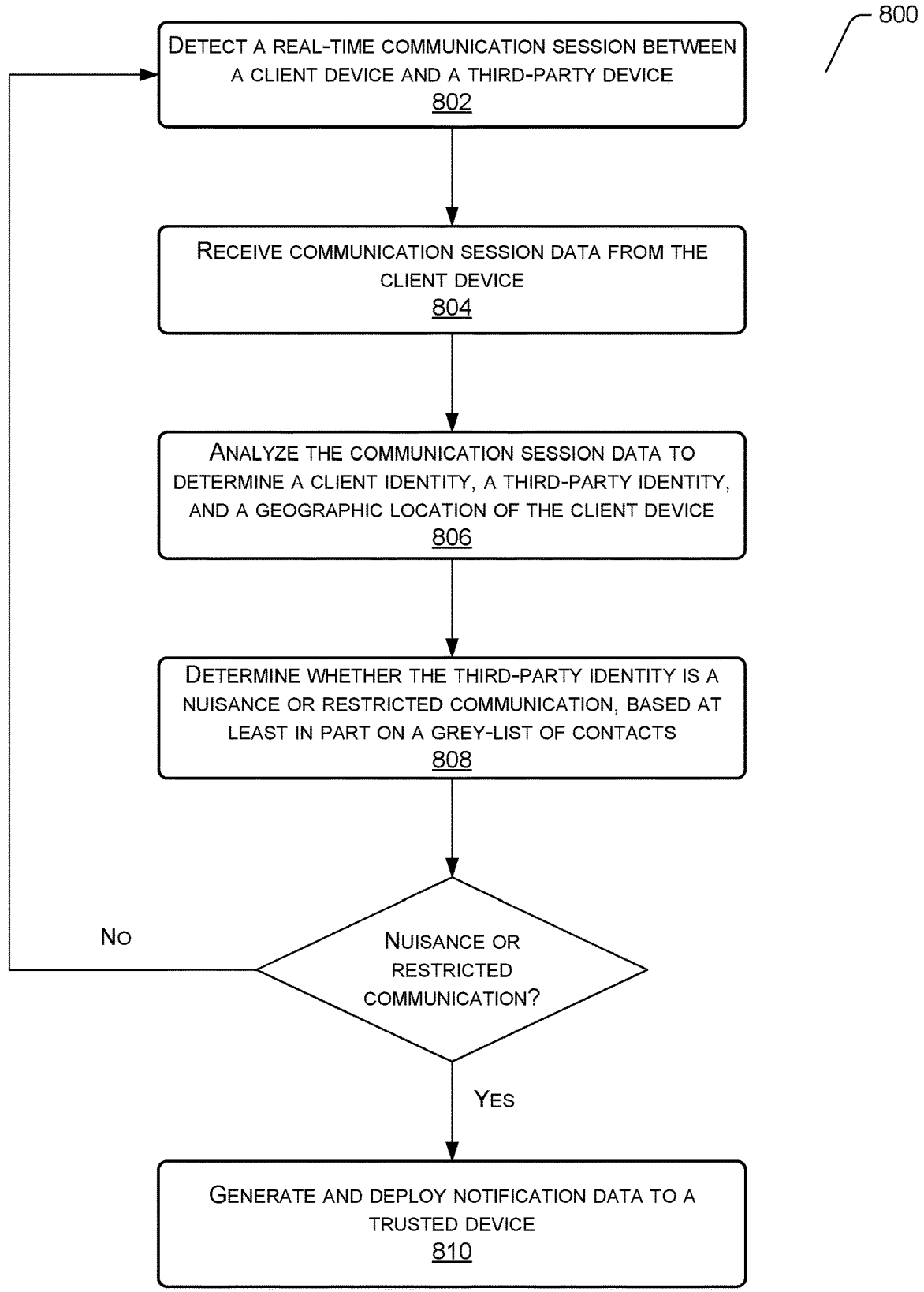
FIG. 8 illustrates a process for analyzing a real-time communication associated with a client account relative to a grey-list of contacts.

FIG. 8 illustrates a process 800 for analyzing a real-time communication associated with a client account relative to a grey-list of contacts. Moreover, process 800 further describes transmitting notification data to a trusted device based on inferred nuisance or restricted communication. The real-time communication session may be a voice communication or a text communication.

At 802, the CPC system may detect a real-time communication session between a client device of a client account and a third-party device. The CPC system may detect the real-time communication session based on monitoring one or more client devices associated with a client account. Monitoring may occur on a continuous basis, per a predetermined list of contacts, or in response to a triggering event. The list of contacts may include a list of permissible contacts, a list of impermissible contacts, or a grey-list of contacts.

At 804, the CPC system may receive communication session data from the client device associated with a client account. The communication session data may include audio data associated with a voice communication, text data associated with a text communication, and session metadata. The session metadata may further include a client identifier associated with the client device, a third-party identifier associated with the third-party device that is interacting with the client device during the real-time communication session, and sensor data from a GPS sensor associated with the client device.

At 806, the CPC may analyze the communication session data to determine a client identity associated with the client device, a geographic location of the client device, and a third-party identity associated with the third-party device. In some examples, the CPC system may determine and/or confirm a client identity and a third-party identity using the audio data from the communication session data. More specifically, the CPC system may perform a voice biometric analysis of a client voice associated with the client device and a third-party voice associated with the third-party device.

At 808, the CPC system may determine whether the real-time communication session is a nuisance concern or a restricted communication, based at least in part on a set of communication privilege rules. More specifically, the CPC system may determine whether the third-party identity is listed on a grey-list of contacts associated with the client identity or client account. Regarding the grey-list of contacts, the CPC system may use the session metadata associated with the real-time communication session to determine whether the real-time communication session satisfies communication rules that permit or limit communications (i.e. time of day, day of week, geographic location of the client device, and/or so forth) between the client identity and the third-party identity.

At 810, the CPC system may determine that the real-time communication session is a nuisance or a restricted communication based at least in part on the analysis of the third-party identity relative to the grey-list of contacts. In this example, the CPC system may generate a communication integrity score that is less than a predetermined integrity threshold, inferring that the real-time communication session is a nuisance or a restricted communication.

Therefore, the CPC system may generate notification data for transmission to a trusted device associated with the client account, based at least in part on a set of communication privilege rules. For example, the CPC system may configure the notification data to alert a trusted device of the nuisance or restricted communication, present the trusted device with selectable options to control the real-time communication session, or alert the trusted device that the real-time communication has been automatically controlled.

Alternatively, the CPC system may determine that the communication integrity score is greater than or equal to the predetermined integrity threshold. In this example, the CPC system is inferring that the real-time communication session is unlikely to be a nuisance or a restricted communication. Therefore, process 800 may return to step 802, and the CPC system may continue to detect a real-time communication session between a client device of the client account and a third-party device.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A computer-implemented method, comprising:
   retrieving a set of communication privilege rules that are for a control of real-time communications associated with a client account and that include a grey-list of contacts with whom a secondary account holder (SAH) of the client account is permitted limited communications based on a set of conditions that includes a geolocation of an SAH device associated with the SAH;
   detecting a real-time communication session between the SAH device and a third-party device;
   retrieving, from the SAH device, session metadata that includes a third-party identifier and the geolocation of the SAH device;
   based at least in part on the grey-list of contacts and the session metadata, determining that the real-time communication session is restricted by the set of communication privilege rules;
   selecting a trusted device to intercept the real-time communication session; and
   causing the SAH device to re-direct the real-time communication session from the SAH device to the trusted device.

2. The computer-implemented method of claim 1, further comprising:
   generating communication session data for delivery to the SAH device, the communication session data including computer-executable instructions that are executable on the SAH device to cause the SAH device to automatically re-direct the real-time communication session from the SAH device to the trusted device.

3. The computer-implemented method of claim 1, further comprising:
   transmitting to a Primary Account Holder (PAH) device of the client account, a message indicating that the real-time communication session has been redirected to the trusted device.

4. The computer-implemented method of claim 1, wherein the set of communication privilege rules include trust parameters for user-selection of the trusted device,
   wherein the trusted device is selected based at least in part on the trust parameters.

5. The computer-implemented method of claim 1, further comprising:
   determining the grey-list of contacts from a group of contacts based on a number of minutes of voice communications over a time period between the SAH and each contact of the group of contacts.

6. The computer-implemented method of claim 1, further comprising:
   determining the grey-list of contacts from a group of contacts based on a number of text message communications over a time period between the SAH and each contact of the group of contacts.

7. The computer-implemented method of claim 1, further comprising:
   determining the grey-list of contacts from a group of contacts based on the geolocation of the SAH device.

8. A computer-implemented method, comprising:
   retrieving, from a data store, a set of communication privilege rules that are for a control of real-time communications associated with a client account and that include a grey-list of contacts with whom a secondary account holder (SAH) of the client account is permitted limited communications based on a set of conditions that includes a geolocation of an SAH device associated with the SAH;
   detecting a real-time communication session between a the SAH device and a third-party device;
   retrieving, from the SAH device, session metadata that includes a third-party identifier and the geolocation of the SAH device;
   based at least on the grey-list of contacts and the session metadata, determining that the real-time communication session is restricted by the set of communication privilege rules;
   selecting a trusted device to intercept the real-time communication session; and
   re-directing the real-time communication session from the SAH device to the trusted device.

9. The computer-implemented method of claim 8, further comprising:
   generating communication session data for delivery to the SAH device, the communication session data including computer-executable instructions that are executable on the SAH device to cause the SAH device to automatically re-direct the real-time communication session from the SAH device to the trusted device.

10. The computer-implemented method of claim 8, further comprising:
    transmitting to a Primary Account Holder (PAH) device of the client account, a message indicating that the real-time communication session has been re-directed to the trusted device.

11. The computer-implemented method of claim 8, wherein the set of communication privilege rules include trust parameters for user-selection of the trusted device,
    wherein the trusted device is user-selected based at least in part on the trust parameters.

* * * * *